July 7, 1931.    R. J. MINSHALL    1,813,356
TAIL WHEEL SUPPORT
Filed May 28, 1930

INVENTOR
ROBERT J. MINSHALL
BY
*James L. Kivnan*
ATTORNEY

Patented July 7, 1931

1,813,356

UNITED STATES PATENT OFFICE

ROBERT J. MINSHALL, OF SEATTLE, WASHINGTON, ASSIGNOR TO BOEING AIRPLANE COMPANY, OF SEATTLE, WASHINGTON

TAIL WHEEL SUPPORT

Application filed May 28, 1930. Serial No. 456,413.

This invention relates to improvements in aircraft and more especially to the tail wheel supporting means therefor.

The principal object of the invention is to provide a structure of this character which will maintain the pivotal axis of the wheel fork in a position at right angles to the ground line when the aircraft is either at rest or taxiing on the ground, and at the same time permit yielding movement of the wheel upwardly, downwardly and/or rearwardly.

These and other objects will appear as my invention is more fully hereinafter described in the following specification, illustrated in the accompanying drawings and finally pointed out in the appended claims.

Figure 1:
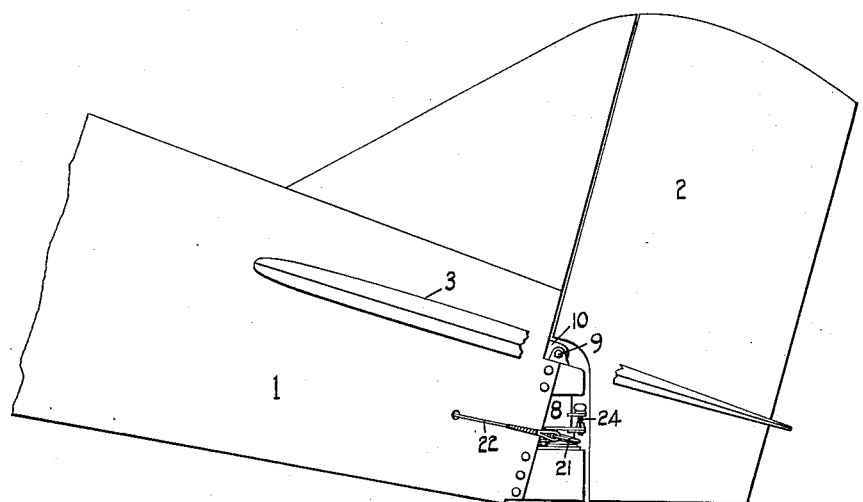
Figure 1 is a fragmentary view of the tail portion of an airplane with my improved form of tail wheel support in operative engagement therewith.

The fuselage 1 of an airplane, having the usual tail surfaces 2 and 3 and tail post 4, has a vertical bearing 6 extending rearwardly from the tail post and securely mounted thereto by means of bolts 5. This bearing 6 is internally lined with a rubber bushing 7. Mounted within the bearing is a vertically disposed shock absorber 8 of the conventional "Oleo" type. The upper end of the shock absorber is pivotally secured to the tail post by means of a bolt 9 secured to a pair of lugs 10.

The lowermost end of the shock absorber is formed with a bifurcated extension 13 to which a wheel fork 14 is bolted for swinging movement by means of a bolt 15. A coil spring 16 is arranged within the wheel fork to permit yielding movement of the fork. One end of the spring is secured to a block 17 by means of a bolt 17a. The block is mounted within the extension 13 by means of rivets 18. The opposite end of the spring is secured to the fork by means of a bolt 19.

A collar 20 is mounted to the shock absorber casing and carries a mast 21 which is provided with steering cables 22 which extend forward and connect with the usual rudder cables. (Not shown.)

Figures 2, 3:
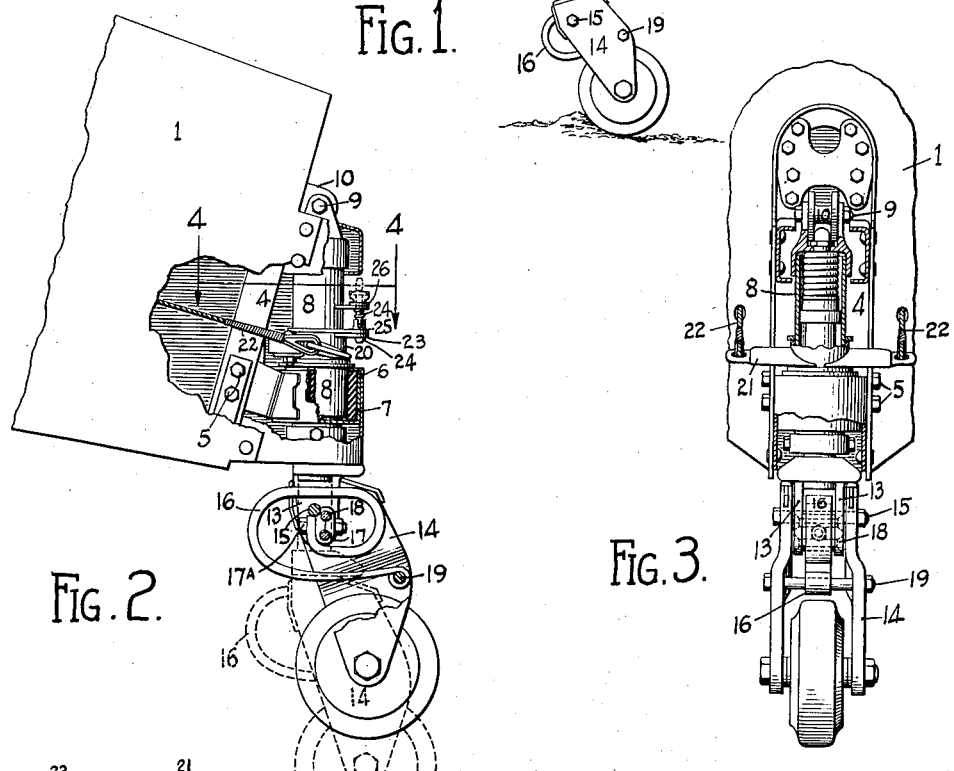
Figure 2 is an enlarged side elevation of the tail wheel support with parts broken away for convenience of illustration.
Figure 3 is an end view of Figure 1 with parts omitted.
Figure 4:
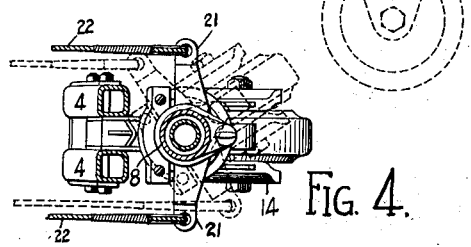
Figure 4 is a sectional plan view taken on the line 4—4 of Figure 2.

The collar is formed with an apertured extension 23 which is adapted to receive a pin 24 which is slidably mounted in extensions 25 and 26 formed on the body of the shock absorber. With the pin in its full line position, as shown in Figure 2, it is engaged with the aperture in the extension 23 on the collar, and through such engagement the collar and shock absorber, through the mast and steering cables, become steerable as a unit for taxiing purposes. When the pin is removed from the apertured extension, the shock absorber and wheel are then free to be rotated in any direction for convenience in moving the airplane around on the field, or in and out of hangars and the like.

In Figure 1 the wheel is shown contacting with an obstruction on the ground causing a rearward movement of the wheel fork to its limit stop.

It will be seen in Figures 1 and 2 that the shock absorber is arranged at an angle with respect to the tail post. This arrangement is made so that the pivotal axis of the wheel fork will be at right angles to the ground line when the airplane is taxiing or at rest on the field, thus a minimum turning effort is required to steer the wheel.

While I have shown a particular form of embodiment of my invention, I am aware that many minor changes therein will readily suggest themselves to others skilled in the art without departing from the spirit and scope of the invention. Having thus described the invention, what I claim as new and desire to protect by Letters Patent is:—

Claims:

1. A tail wheel support of the class described consisting of a pair of aligned bearings having their centerline arranged at an angle with respect to the tail post of an airplane, said bearings rotatably supporting a shock absorbing unit having a wheel and wheel fork swingably depending therefrom, a resilient means independent of the shock absorbing unit arranged within the fork and adapted to resist the rearward movement thereof.

2. A tail wheel support for aircraft consisting of a pair of aligned bearings arranged with their centerline at an angle with respect to the tail post of said aircraft, a shock absorbing unit rotatably mounted within said bearings and within a rubber bushing mounted in one of said bearings, a wheel fork swingably depending from said shock absorbing unit, a coil spring having one of its ends connected with said shock absorbing unit and its other end connected with said wheel fork.

3. A tail wheel support for aircraft consisting of a shock absorbing unit rotatably mounted to the tail post of the aircraft, the pivotal axis of said shock absorbing unit being at right angles to the ground when the airplane is taxiing or at rest thereon, a wheel and wheel fork swingably depending from said shock absorbing unit and a resilient means interposed between said wheel fork and said shock absorbing unit, and independent of the latter, a steering mast and cables therefor detachably secured to said shock absorber.

4. A tail wheel support for aircraft consisting of a shock absorbing unit rotatably mounted to the tail post of the aircraft, the pivotal axis of said shock absorbing unit being at right angles to the ground when the airplane is taxiing or at rest thereon, a wheel and wheel fork swingably depending from said shock absorbing unit and a resilient means interposed between said wheel fork and said shock absorbing unit, a steering mast detachably secured to said shock absorber and steering cables interconnecting said mast with the rudder control cables of said airplane.

5. A tail wheel support for an airplane comprising bearing means carried upon the tail post, the axis thereof being substantially normal to the ground line when the tail wheel rests upon the ground, a wheel fork and a post therefor received in said bearing for pivotal movement, a pivotal connection on a transverse horizontal axis between the wheel fork and its supporting post, permitting swinging of the wheel fork relative to the post, resilient means resisting such swinging of the fork, and steering means detachably secured to said post.

6. In combination with the tail wheel of an airplane, a support therefor comprising bearing members supported from the tail post, the axis thereof being substantially normal to the ground line when the tail wheel rests upon the ground, a wheel fork in which the wheel is journaled and a post therefor received in said bearing for pivotal movement, and itself vertically and resiliently reciprocal in the bearings, a pivotal connection between the wheel fork and its supporting post on a transverse horizontal axis, and resilient means permitting swinging of the wheel fork relative to the post.

7. A tail wheel support for an airplane comprising bearing means carried upon the tail post, the axis thereof being substantially normal to the ground line when the tail wheel rests upon the ground, a wheel fork and a post therefor received in said bearing for pivotal movement, a pivotal connection on a transverse horizontal axis between the wheel fork and its supporting post, permitting swinging of the wheel fork relative to the post, resilient means resisting such swinging of the fork, a steering mast loose upon said post, a collar fast upon the post, and means to secure together the collar and steering mast for steering control of the post and associated parts.

8. In combination with the tail wheel of an airplane, a support therefor comprising an upright post, means supporting said post from the tail post for oscillation about an axis substantially normal to the ground line when the wheel rests upon the ground, a wheel fork directly supporting the wheel, a pivotal connection between the post and the wheel fork upon a transverse horizontal axis, a spring fixed at one end to the post, and supporting the wheel fork outwardly from its pivot.

9. In combination with the tail wheel of an airplane, a support therefor comprising an upright post, means supporting said post from the tail post for oscillation about an axis substantially normal to the ground line when the wheel rests upon the ground, a wheel fork directly supporting the wheel, a pivotal connection between the post and the wheel fork upon a transverse horizontal axis, a spring fixed at one end to the post, and supporting the wheel fork outwardly from its pivot, and resilient means permitting axial reciprocation of the post.

In testimony whereof I affix my signature.

ROBERT J. MINSHALL.